United States Patent [19]
Tsujimoto

[11] Patent Number: 5,969,719
[45] Date of Patent: Oct. 19, 1999

[54] COMPUTER GENERATING A TIME-VARIABLE ICON FOR AN AUDIO SIGNAL

[75] Inventor: Taizou Tsujimoto, Osaka, Japan

[73] Assignee: Matsushita Electric Industrial Co., Ltd., Osaka, Japan

[21] Appl. No.: 08/877,242

[22] Filed: Jun. 17, 1997

Related U.S. Application Data

[63] Continuation of application No. 08/558,972, Nov. 13, 1995, abandoned, which is a continuation of application No. 08/070,681, Jun. 2, 1993, abandoned.

[30] Foreign Application Priority Data

Jun. 2, 1992 [JP] Japan .................................. 4-141305
May 25, 1993 [JP] Japan .................................. 5-122350

[51] Int. Cl.$^6$ ....................................................... H04B 1/00
[52] U.S. Cl. ............................................ 345/349; 345/302
[58] Field of Search ..................................... 345/302, 122; 395/2.16, 2.84, 2.85; 381/119

[56] References Cited

U.S. PATENT DOCUMENTS

| | | | |
|---|---|---|---|
| 4,845,753 | 7/1989 | Yasunaga ................................. | 704/217 |
| 4,847,785 | 7/1989 | Stephens ................................. | 345/440 |
| 4,884,972 | 12/1989 | Gasper ................................... | 434/185 |
| 5,065,345 | 11/1991 | Knowles et al. ........................ | 345/302 |
| 5,111,409 | 5/1992 | Gasper et al. ........................... | 345/302 |
| 5,133,075 | 7/1992 | Risch ..................................... | 707/201 |
| 5,148,154 | 9/1992 | Mackay et al. .......................... | 345/340 |
| 5,206,929 | 4/1993 | Langford et al. ....................... | 345/328 |
| 5,208,897 | 5/1993 | Hutchins ................................ | 704/200 |
| 5,212,733 | 5/1993 | DeVitt et al. ........................... | 381/119 |
| 5,265,191 | 11/1993 | McNair .................................. | 704/272 |
| 5,307,456 | 4/1994 | Mackay .................................. | 345/328 |
| 5,313,408 | 5/1994 | Goto .................................. | 395/200.66 |
| 5,333,299 | 7/1994 | Koval et al. ............................ | 395/551 |
| 5,339,392 | 8/1994 | Risberg et al. ......................... | 345/333 |
| 5,355,450 | 10/1994 | Garna et al. ............................ | 345/501 |
| 5,388,197 | 2/1995 | Rayner ................................... | 345/328 |
| 5,402,499 | 3/1995 | Robison et al. ........................ | 381/119 |
| 5,402,501 | 3/1995 | Silfvajt et al. .......................... | 381/119 |
| 5,467,288 | 11/1995 | Fasciano et al. ........................ | 345/328 |

OTHER PUBLICATIONS

Ludwig et al, Extending the Notion of a Window System to Audio, Computer, vol. 23 No. 8, Aug. 1990, pp. 66–72.

Tonomura et al, Content Oriental Visual Interface Using Video Icons for Visual Database Systems, Visual Languages 1989 IEEE Workshop, 1989, pp. 68–73.

Hsia et al, Construction and Manipulation of Dynamic Icons, Visual Languages IEEE 1988 Workshop, 1988, pp. 78–83.

Dyson, Making Sense of the Digital World, Seybold Report on Desktop Publishing, Aug. 13, 1990, pp. 3–15.

Rangan et al, Window Based Editor for Digital Video and Audio, Proc of 25$^{th}$ Hawaii Intl Conference on System Sciences, 1991, pp. 640–648.

Seybold, Glimpsing the Future of PC's, Seybold Report, May 11, 1992, pp. 16–20.

Cross, Playing Live Digital Video Under Windows, Windows–DOS Developer's Journal, Mar. 1992, pp. 39–48.

Green, The Evolution of DVI System Software, Communication of the ACM, Jan. 1992, pp. 52–67.

D. Young, "X Window Systems: Programming and Applications with Xt", pp. 164–167, (Prentice–Hall, 1989) (Japanese translation published Jul. 30, 1990).

*Primary Examiner*—Anton Fetting
*Attorney, Agent, or Firm*—McDermott, Will & Emery

[57] ABSTRACT

This invention provides a computer capable of displaying information in multiple windows and handling multiple audio signals in a manner convenient for a user. This is achieved in one embodiment of the present invention by audibly producing only one audio signal at a time, but allowing the user to monitor a second received audio signal by visually representing the second audio signal through a displayed icon. The display of the icon may vary over time, reflecting time-variable characteristics of the signal represented by the icon, thus enabling the user to monitor the audio signals that are received but not actually audibly produced. Examples of such time-variable characteristics include volume, semantics and pitch.

15 Claims, 10 Drawing Sheets

COMPUTER GENERATING A TIME-VARIABLE ICON FOR AN AUDIO SIGNAL

This is a continuation application of application Ser. No. 08/558,972, filed Nov. 13, 1995, now abandoned, which is a continuation application of application Ser. No. 08/070,681, filed Jun. 2, 1993, now abandoned.

BACKGROUND OF THE INVENTION

This invention generally relates to computers. In particular, it pertains to a computer which not only has audio signal input/output capability but also employs a multi-window display system.

The computer industry has continuously introduced various multi-media computers, many of which have audio signal input/output capability together with animated image display capability. Such a multi-media computer generally employs a multi-window display system to display different information simultaneously and independently on different areas called windows resulting from splitting a display screen, and plural icons are usually displayed so that an operator can activate any one of them using a device called a mouse.

In a conventional multi-window display system, a window, in which information that is not currently referred to by an operator is being displayed, can be closed to display an alternative to that window, i.e., an icon image with a smaller area. Thus, the area of a screen is effectively used. When closing an unnecessary window to display it as an icon image, a pattern to be applied to an icon image is read from a corresponding memory for display. Thereafter, such an icon image is displayed as a still image keeping the same pattern until it is activated to open a window.

There are certain types of icon images capable of changing their patterns whilst being displayed on the screen of a display unit. For example, when an icon image is selected by an operator with a mouse for initiating input operations, such an icon image changes its pattern so as to indicate its current status of "being selected". For the case of an icon image of a clock, such an icon image can change its pattern so as to show time. For the case of an icon image indicative of whether an electronic mail is received, it can change its pattern when a monitoring system detects the receipt of an electronic mail. However, it will take at least a period of some several seconds for an icon image to be able to change its pattern. Any shorter period than that results in disadvantageously increasing the burden to be handled by a CPU. This prevents conventional techniques from producing an icon image which shows no awkward movements.

There are several drawbacks presented by conventional multi-media computers.

For example, with a first piece of information being displayed in a first window, and with a first audio signal corresponding to the first piece of information being output through a loudspeaker in the form of a sound, if the first window is closed and displayed as an icon image in order that a second piece of information is displayed in a second window, both the first and second audio signals will be output in the form of a sound at the same time. This causes hearing confusion to an operator.

Meanwhile, if an audio signal corresponding to information of a closed window in the form of an icon image is stopped, that is to say, if such an audio signal is not output currently through a loudspeaker in the form of a sound, this allows an operator to clearly hear a sound corresponding to information displayed in a newly opened window. However, this presents a problem that it is most hard for an operator to visually realize that there exists a concealed sound behind a closed window now in the form of an icon image, since such a closed window is displayed as a still image with no movements.

SUMMARY OF THE INVENTION

Bearing in mind the foregoing disadvantages in the prior art techniques, the present invention was made. It is a general object of this invention to provide an improved computer which not only has audio signal input/output capability but also employs a multi-window display system. In accordance with a computer of the present invention, even when a window is displayed as an icon image on the screen of a display unit while an audio signal corresponding to that window is not output through a loudspeaker in the form of a sound, this situation can be realized visually by an operator. In other words, this allows an operator to learn that there exists a concealed sound behind an icon image without causing any difficulties in hearing to the operator.

A first computer in accordance with the invention comprises (a) a display unit for displaying different information on different windows assigned on its screen, (b) an audio signal input/output unit for receiving a plurality of external audio signals, and for outputting a particular audio signal selected from among all the audio signals in the form of a sound, (c) an audio information extract unit for extracting real-time information from an audio signal other than the particular audio signal, (d) an icon image generator for generating an animated icon image according to the real-time information, and (e) a display controller for exerting control to make the display unit display the animated icon image on the screen instead of displaying information corresponding to the audio signal from which the real-time information has been extracted.

A second computer in accordance with the invention comprises (a) a display unit for displaying different information on different windows assigned on its screen, (b) an audio signal input/output unit for receiving a plurality of external audio signals, and for outputting a particular audio signal selected from among all the audio signals in the form of a sound, (c) an audio information extract unit for extracting real-time information from an audio signal other than the particular audio signal, (d) an icon image generator for generating an animated icon image according to the real-time information, (e) a display controller for exerting control to make the display unit display the animated icon image on the screen instead of displaying information corresponding to the audio signal from which the real-time information has been extracted, and (f) a comparator for making a comparison between the real-time information and information predetermined by an operator so as to detect whether comparison requirements are satisfied, and for delivering a detection signal to control the audio signal input/output unit or both the icon image generator and the display controller upon detecting the comparison requirements to be satisfied.

In accordance with the invention, with first information displayed in a first window, and with a first audio signal corresponding to the first information output through a loudspeaker in the form of a sound after selected by an audio signal input/output unit, if second information is displayed in a second window while at the same time a second audio signal corresponding to the second information is output through the loudspeaker after selected by the audio signal input/output unit, this stops the first audio signal from being output through the loudspeaker. Then, from the first audio signal which is not currently output in the form of a sound through the loudspeaker, real-time information is extracted, such as the level of volume, a sentence as a result of the speech recognition, and a pair of a pitch and a length as a result of the musical note recognition or a sound source if audio signals represent a music sound. According to such real-time information, animated icon images are produced, such as an image which changes its size with time, an image of a volume level indicator which indicates the level of volume with time, or a caption which represents a sentence with time. Instead of displaying the first information corresponding to the first audio signal which has been stopped, the display unit displays such an animated icon image on the screen. This makes an operator able to realize visually that there exists a concealed sound behind an icon image, without causing any difficulties in hearing to the operator.

Especially, changing the size of an icon image is a most attractive way for an operator to realize the above-described condition.

Additionally, if a sentence, resulting from the speech recognition of an audio signal which is currently prevented from being output through a loudspeaker, is designed to be displayed on a screen, this allows an operator to easily monitor information not currently displayed due to a window containing such information being displayed as an icon image. Accordingly, an operator can timely activate such an icon image to reopen that window to obtain without fail every piece of information which has not been displayed by then.

The above-described case, however, presents such a problem that an operator cannot obtain desired information if there is some working situation which prevents him or her from intensively monitoring an icon image on display, even if such information as to the contents of an audio signal which is currently prevented from being output in the form of a sound is displayed as an icon image. This problem, however, is eliminated by means of a comparator to which, for example, a character string representing information that an operator wants to hear is previously established. Such a comparator makes a comparison between real-time information extracted from an audio signal which is not currently output through a loudspeaker in the form of a sound (for example, a sentence as a result of recognizing speech within that audio signal) and the previously established information. When the comparator detects requirement conditions to be satisfied, that is to say, when an audio signal which is not output currently in the form of a sound is found to carry information that an operator wants to hear, an audio signal input/output unit is so controlled that such an interrupted audio signal automatically starts being output in the form of a sound. At the same time an icon image generator and a display controller are also controlled to bring the generation of icon images to a halt, and meanwhile a display unit automatically displays information corresponding to the audio signal which has been stopped by then, instead of displaying a corresponding icon image. Accordingly, this enables an operator not only to monitor information contained in an audio signal which is not output currently in the form of a sound but also to timely hear such information without fail.

BRIEF DESCRIPTION OF THE DRAWINGS

Other objects, features, and advantages of the present invention will be more clearly understood from the following description when considered in conjunction with the accompanying drawings wherein.

DESCRIPTION OF THE PREFERRED EMBODIMENTS

With reference to the accompanying drawings, preferred embodiments of the present invention are now described below. In this invention, by "to display a signal on a screen" or "a signal is displayed on a screen", what is meant is that information corresponding to a signal is displayed as an image on a screen.

First Embodiment

Figure 1:
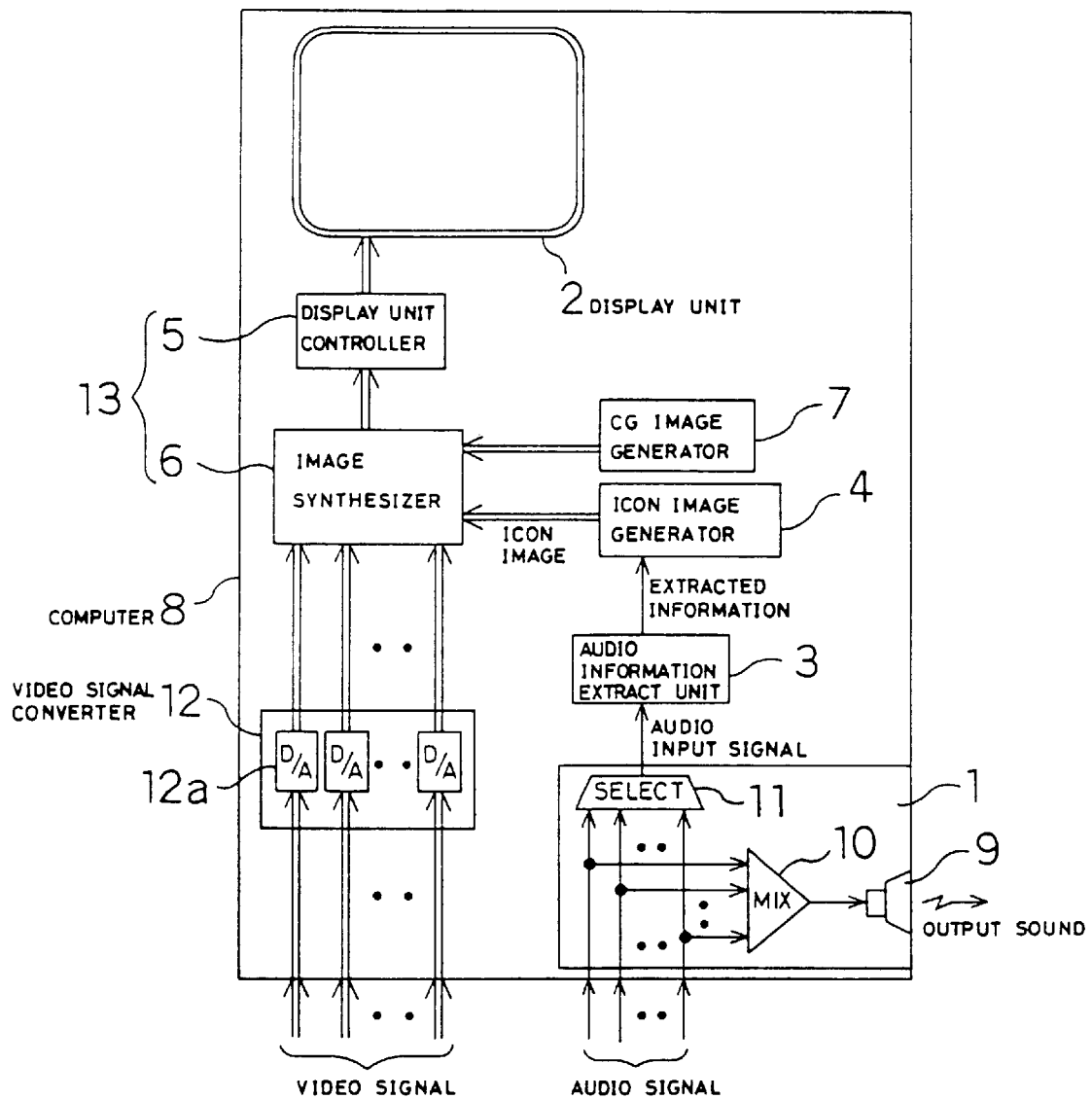
FIG. 1 is a block diagram showing the configuration of a computer of a first embodiment of the invention.

FIG. 1 schematically shows a computer 8 which comprises an audio signal input/output unit 1, a display unit 2, an audio information extract unit 3, an icon image generator 4, a display unit controller 5, an image synthesizer 6, a CG (computer graphic) image generator 7, and a video signal converter array 12.

The audio signal input/output unit 1 is fed with external audio signals, and is composed of a loudspeaker 9, an audio signal mixing/amplifying unit 10, and an audio signal selector 11. The audio signal mixing/amplifying unit 10 has a mixing function so that it can perform the function of weighting each audio signal according to a predetermined weight. After summing numerical values obtained by such weighting, the audio signal mixing/amplifying unit 10 outputs calculation results through the loudspeaker 9. Further, this mixing function of the audio signal mixing/amplifying unit 10 includes a selective output function so as to exclusively output a particular audio signal selected from among the audio signals, or to stop outputting a particular audio signal. The foregoing weight is variable. The audio signal selector 11 performs the function of selecting from among the audio signals an audio signal, which has been prevented from being output due to the selective output function of the audio signal mixing/amplifying unit 10, to output it.

Although not shown in FIG. 1, the display unit 2 has a plurality of windows on its screen.

Upon receiving an audio signal delivered from the audio signal selector 11, the audio information extract unit 3 extracts a volume level of that audio signal as real-time information.

According to the volume level extracted by the audio information extract unit 3 as real-time information, the icon image generator 4 generates an icon image. More specifically, the icon image generator 4 generates, according to the extracted volume level, an icon image whose size varies with time as shown in FIG. 2(c). This makes such an icon image look animated.

As shown in FIG. 2(b), the CG image generator 7 performs the function of generating a still image which serves as a window on the screen of the display unit 2.

The video signal converter array 12 comprises plural digital-to-analog converters (DAC's) 12a. Each of the DAC's 12a converts analog video signals into digital video signals, thereafter outputting them.

The image synthesizer 6 performs the function of selecting a predetermined video signal from among the video signals delivered from the video signal converter array 12 so as to display the selected video signal in a window generated by the CG image generator 7. The image synthesizer 6 performs the further function of synthesizing video signals, static images, and icon images in order to display an icon image generated by the icon image generator 4 on a predetermined area of the screen of the display unit 2.

Based on a signal synthesized by the image synthesizer 6, the display unit controller 5 performs the function of controlling the display unit 2 so that a video signal and an icon image are displayed on the screen of the display unit 2.

The display unit controller 5 and the image synthesizer 6 together constitute a display controller 13. Under control of the display controller 13, an icon image generated by the icon image generator 4 is displayed on the screen of the display unit 2 instead of information corresponding to the audio signal from which the real-time information has been extracted.

Figure 2:
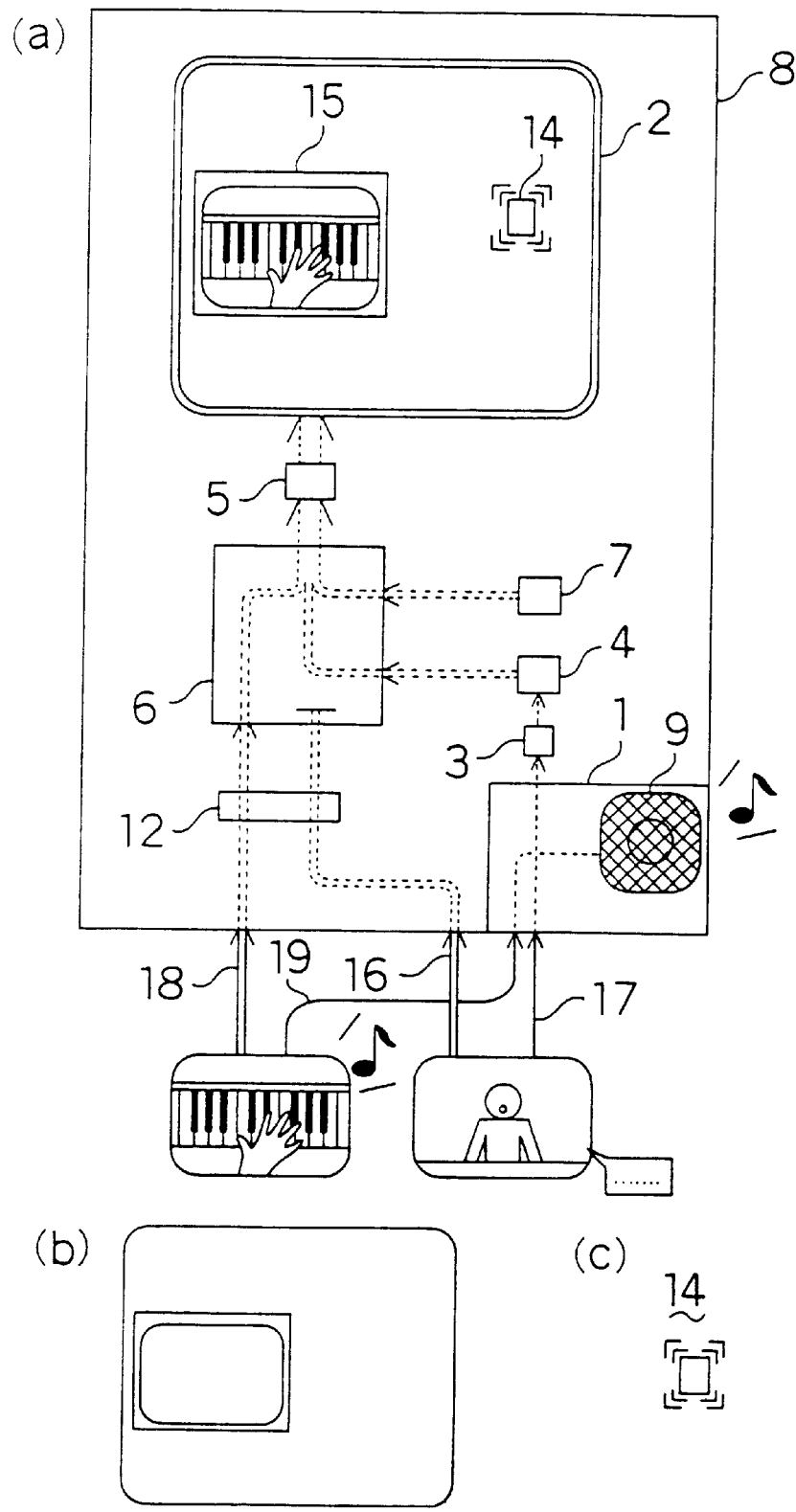
FIG. 2 shows how the computer of the first embodiment operates.

The operation of the computer 8 with the above-described configuration is explained by reference to FIG. 2. In FIG. 2, an icon image resulting from closing or iconizing a window is indicated by reference numeral 14, an image displayed in another window by reference numeral 15, a first video animation signal by reference numeral 16, a first audio signal corresponding to the first video animation signal 16 by reference numeral 17, a second video animation signal by reference numeral 18, and a second audio signal corresponding to the second video animation signal 18 by reference numeral 19. Although neither the audio signal mixing/amplifying unit 10 nor the audio signal selector 11 is shown in FIG. 2, their functions are represented by the flow of signals.

As an example, consider a case in which, with the first video animation signal 16 (announcer) being displayed in a first window of the screen of the display unit 2, and with the first audio signal 17 (voice tone) being output through the loudspeaker 9, the second video animation signal 18 (pianist), is displayed on a second window and the second audio signal 19 (piano sound) is output in the form of a sound through the loudspeaker 9 after it is selected at the audio signal input/output unit 1. This case is explained below.

In this case, the audio signal mixing/amplifying unit 10 (not shown) prevents the first audio signal 17 from passing through the loudspeaker 9. This first audio signal 17 which is stopped by the unit 10 is forwarded to the audio information extract unit 3 from the audio signal selector 11. The audio information extract unit 3 then extracts a volume level from the first audio signal 17 as real-time information, thereafter forwarding it to the icon image generator 4. The icon image generator 4 reduces or enlarges the size of a predetermined icon image according to the volume level extracted by the audio information extract unit 3 thereby producing an animated icon image. After being combined with the second video animation signal 18 by the image synthesizer 6, such an animated icon image is displayed on the screen of the display unit 2 under control of the display controller 5, as the animated icon image 14.

The animated icon image 14 varies its size in order to show an operator the fact that it corresponds to the second audio signal 17, as a result of which it is most easy for an operator to visually recognize that the audio signal 17 is correspondingly existent with respect to the icon image 14.

Since the loudspeaker 9 sends out only the second audio signal 19 (piano sound) while the first audio signal 17 (voice tone) is being stopped, this causes no problems of operator's hearing piano sounds.

In the foregoing description, the animated icon image 14 is generated according to the volume level of the first audio signal 17 which is not output currently in the form of a sound through the loudspeaker 9. By changing the icon image 14 into a much more conspicuous one at the point that the volume level of the first audio signal 17 goes beyond a predetermined value, it is possible to monitor excessive volume levels.

Second Embodiment

Figure 3:
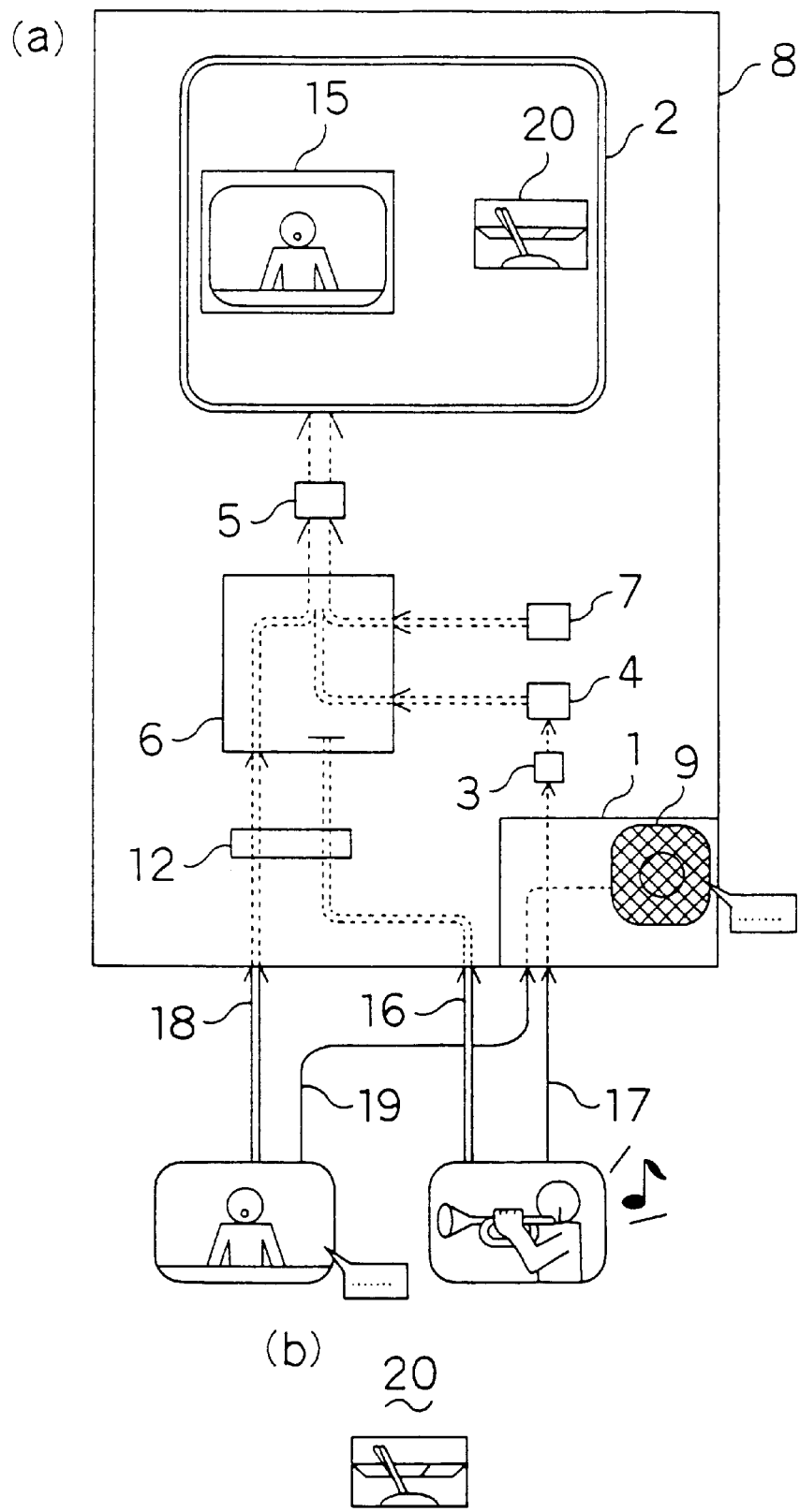
FIG. 3 shows how a computer of a second embodiment of the invention operates.

A second embodiment of the present invention is described by referring to FIG. 3. The first video animation signal 16, which corresponds to the audio signal 17 which is not output currently in the form of a sound through the loudspeaker 9, represents an animated image of a trumpeter. The icon image generator 4 generates an animated icon image 20 of a volume level indicator as shown in FIG. 3(b) which indicates, with time, volume levels extracted by the audio information extract unit 3 from the audio signal 17 (trumpet sound).

This embodiment makes it possible for an operator to monitor the volume level of the audio signal 17 which is not output currently in the form of a sound through the loudspeaker 9.

Third Embodiment

Figure 4:
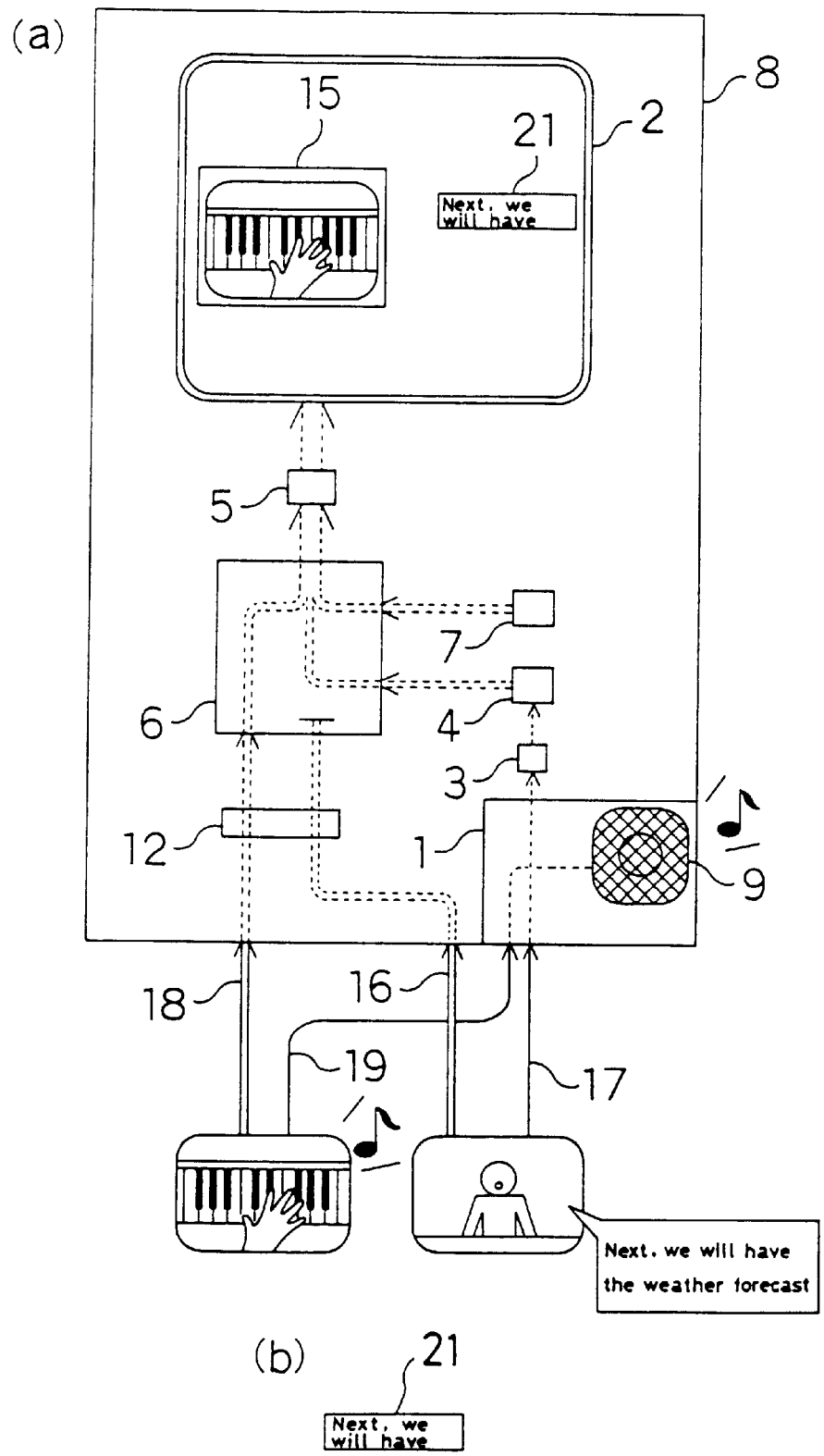
FIG. 4 shows how a computer of a third embodiment of the invention operates.

A third embodiment of the present invention is described by reference to FIG. 4. Here, the first video animation signal 16, which corresponds to the audio signal 17 which is not output currently in the form of a sound through the loudspeaker 9, represents an animated image of an announcer who is reading something, say, an item of news. The audio information extract unit 3 extracts a sentence as real-time information by means of the speech recognition of the audio signal 17 (for example, such a sentence may be "Next, we will have the weather forecast . . . " as shown in FIG. 4). The icon image generator 4 meanwhile generates an animated news caption 21 (FIG. 4(a,b)) according to the sentence extracted by the audio information extract unit 3.

In this embodiment, it is possible to monitor the contents of the audio signal 17 which is not output currently in the form of a sound through the loudspeaker 9.

Fourth Embodiment

Figure 5:
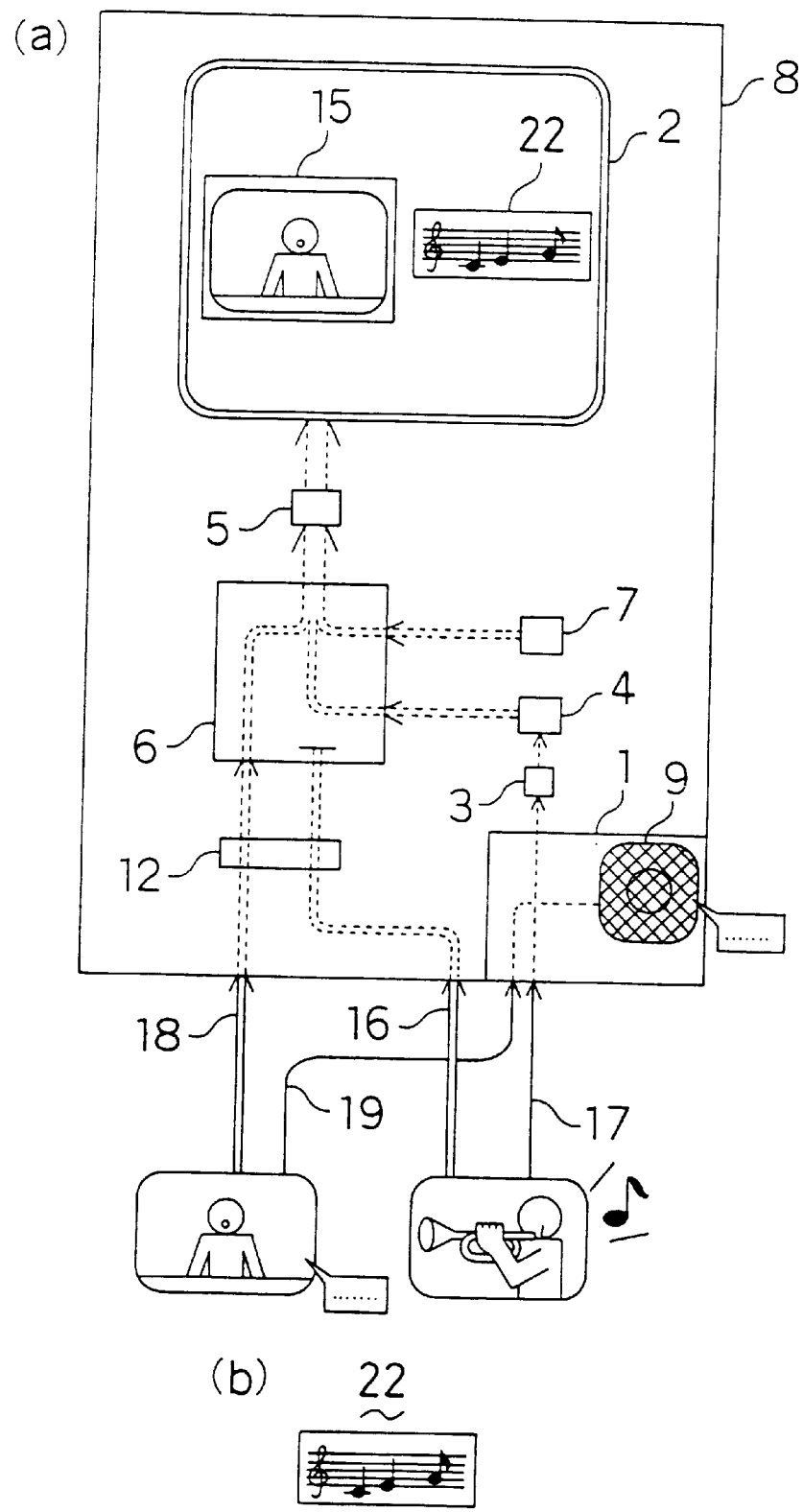
FIG. 5 shows how a computer of a fourth embodiment of the invention operates.

A fourth embodiment of the present invention is described by reference to FIG. 5. The first video animation signal 16, which corresponds to the audio signal 17 which is not output currently in the form of a sound through the loudspeaker 9, represents an animated image of a trumpeter. The audio information extract unit 3 extracts, with time, a pair of a pitch and a length as real-time information by recognizing the musical note within the audio signal 17 (trumpet sound). The icon image generator 4 meanwhile generates a music sheet 22 as an animated icon image carrying thereon musical notes (each of which has a pair of a pitch and a length) extracted by the audio information extract unit 3 from the audio signal 17.

In this embodiment, it is possible to monitor the contents of an audio signal which is not output currently in the form of a sound through the loudspeaker 9. Because of this, such a monitor function is most beneficial when audio signals represent music sounds. Additionally, automatic transcription is made available by storing in a storage medium a music sheet composed automatically with extracted musical notes. Further, it is also possible to monitor the process of automatic transcription by displaying the music sheet as an animated icon image in real time while at the same time storing it.

Fifth Embodiment

Figure 6:
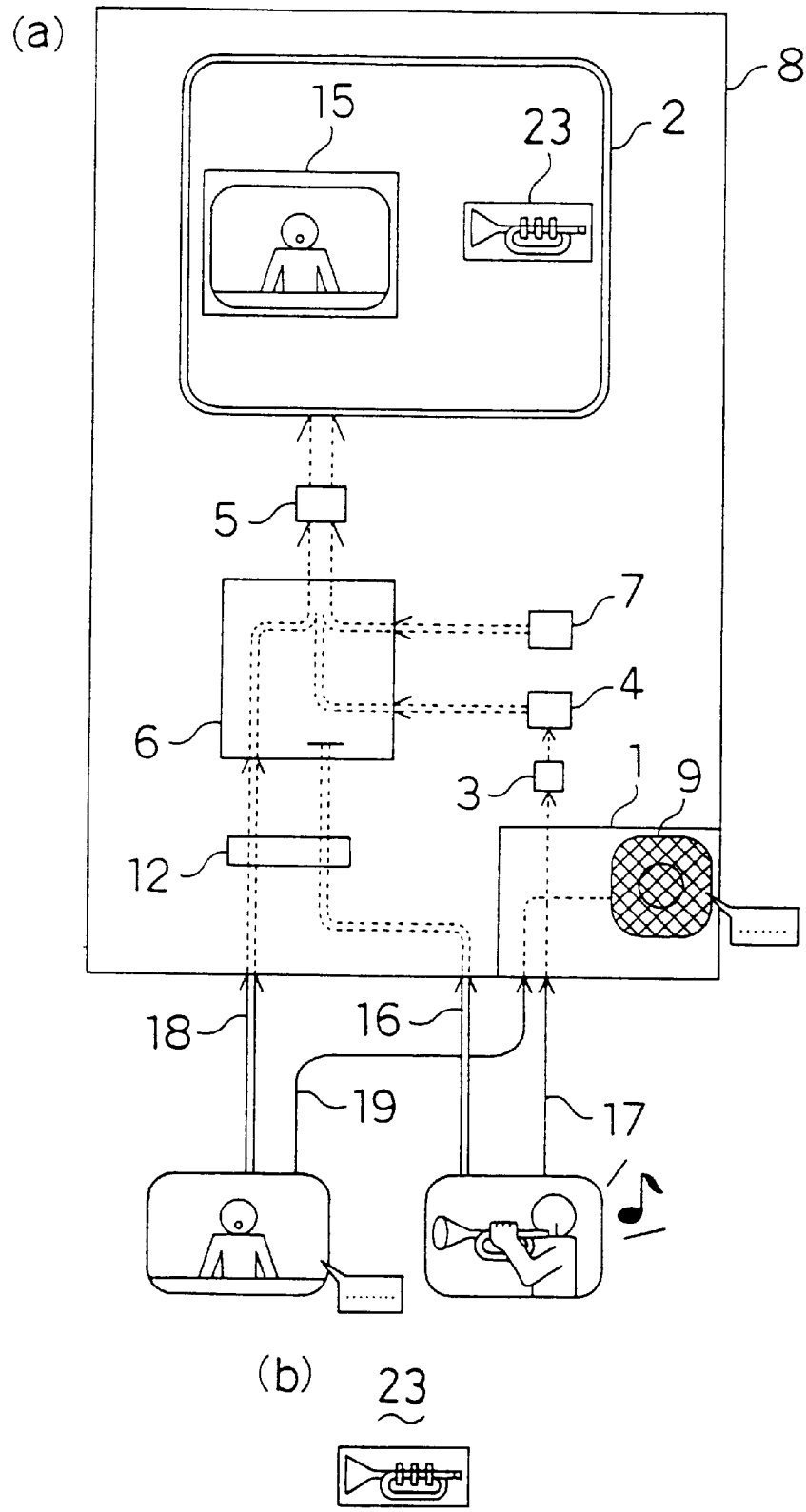
FIG. 6 shows how a computer of a fifth embodiment of the invention operates.

FIG. 6 shows a fifth embodiment of the invention. In this embodiment, at the same condition as that of the fourth embodiment of FIG. 5, the audio information extract unit 3 performs the function of recognizing the audio signal's 17 sound source (i.e., the tone generator of the origin of the audio signal 17)as real-time information, thereby extracting a result of tone generator recognition (trumpet), and the icon image generator 4 meanwhile generates a pattern of a trumpet according to such a tone generator recognition result, as shown in FIG. 6(b).

In this embodiment, it is possible to monitor the sound source, or tone generator of the origin of an audio signal which is not output currently in the form of a sound through the loudspeaker 9, and to give some indication as to the type of audio signal. This embodiment makes use of a devise of a trumpet, however, the exact word "trumpet" may be displayed as an icon image.

In the foregoing descriptions, the audio information extract unit 3 extracts real-time information in the form of a volume level, however, an audio signal envelop may be extracted by the audio information extract unit 3 as real-time information, which simplifies circuitry of the audio information extract unit 3. Further, the full frequency spectrum of an audio signal or part of it may be extracted as real-time information. In this case, a frequency spectrum measuring function is added, so that it is possible to display a signal level at a particular frequency.

Further, in the foregoing descriptions, to accomplish animation effect, an icon image is made to change its size, however, such may be obtained by making an icon image roll or move laterally, reshaping its form, or changing its colors. The case for creating animation effect to an icon image by making it move laterally over a screen is that the icon image generator 4 will have a simpler circuit configuration. There is an advantage in reshaping an icon image that a most conspicuous animated icon image can be available by choosing an adequate icon image as a reference icon image. For the case of changing icon image colors, unwanted overlapping between an icon image and a different window or another icon image can be prevented, since this process involves no changes as to display areas. There is another technique for producing animation effect to an icon image, in which each frame of an icon image is pre-stored in a storage for every sign of real-time information, and every time each sign is extracted a corresponding frame of the icon image is read from the storage to make it become animated as a whole. In this case, by preparing many frames of an icon image in advance to prevent the icon image making no awkward changes, it is possible to display a most conspicuous animated icon image.

Sixth Embodiment

Figure 7:
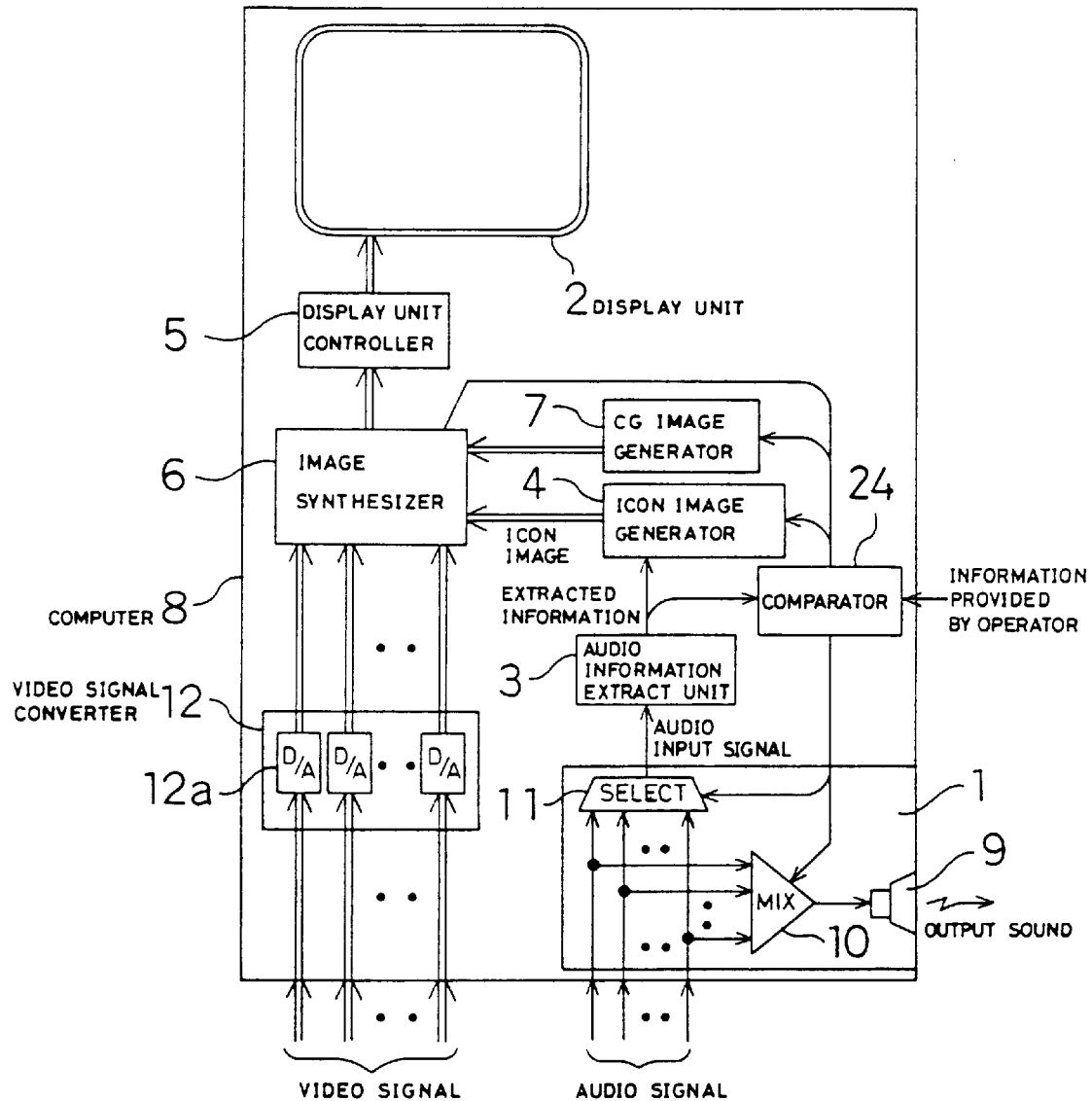
FIG. 7 is a block diagram showing the configuration of a computer of a sixth embodiment of the invention.

A sixth embodiment of the present invention is explained. This embodiment, as seen from FIG. 7, further includes a comparator 24 in addition to the elements described in the first embodiment of FIG. 1. The comparator 24 stores in advance items of predetermined information such as a character string, and is fed with real-time information such as a sentence extracted by the audio information extract unit 3 from an audio signal by means of the speech recognition. The comparator 24 then makes a comparison between the predetermined information and the real-time information, i.e., the sentence. When the comparator detects comparison requirements to be satisfied, that is to say, when a correspondence exists between the real-time information and the predetermined information, the audio signal mixing/amplifying unit 10 is so controlled that every audio signal including one from which the real-time information has been extracted is weighted according to a predetermined weight, and is output through the loudspeaker 9 of the audio signal input/output unit 1 in the form of a sound. At the same time, the audio signal selector 11 is controlled not to select any one of audio signals applied to the audio signal input/output unit 1. The icon image generator 4 is also controlled not to generate any further icon images. Further, the CG image generator 7 and the image synthesizer 6 are controlled so that the synthesis of a static image generated by the CG image generator 7 and all the video signals delivered from the video signal converter array 12 is made to display a synthesized signal on the screen of the display unit 2. The remaining elements are not described here, since they are identical to those shown in FIG. 1. The same reference numerals are assigned to them, accordingly.

Figure 8:
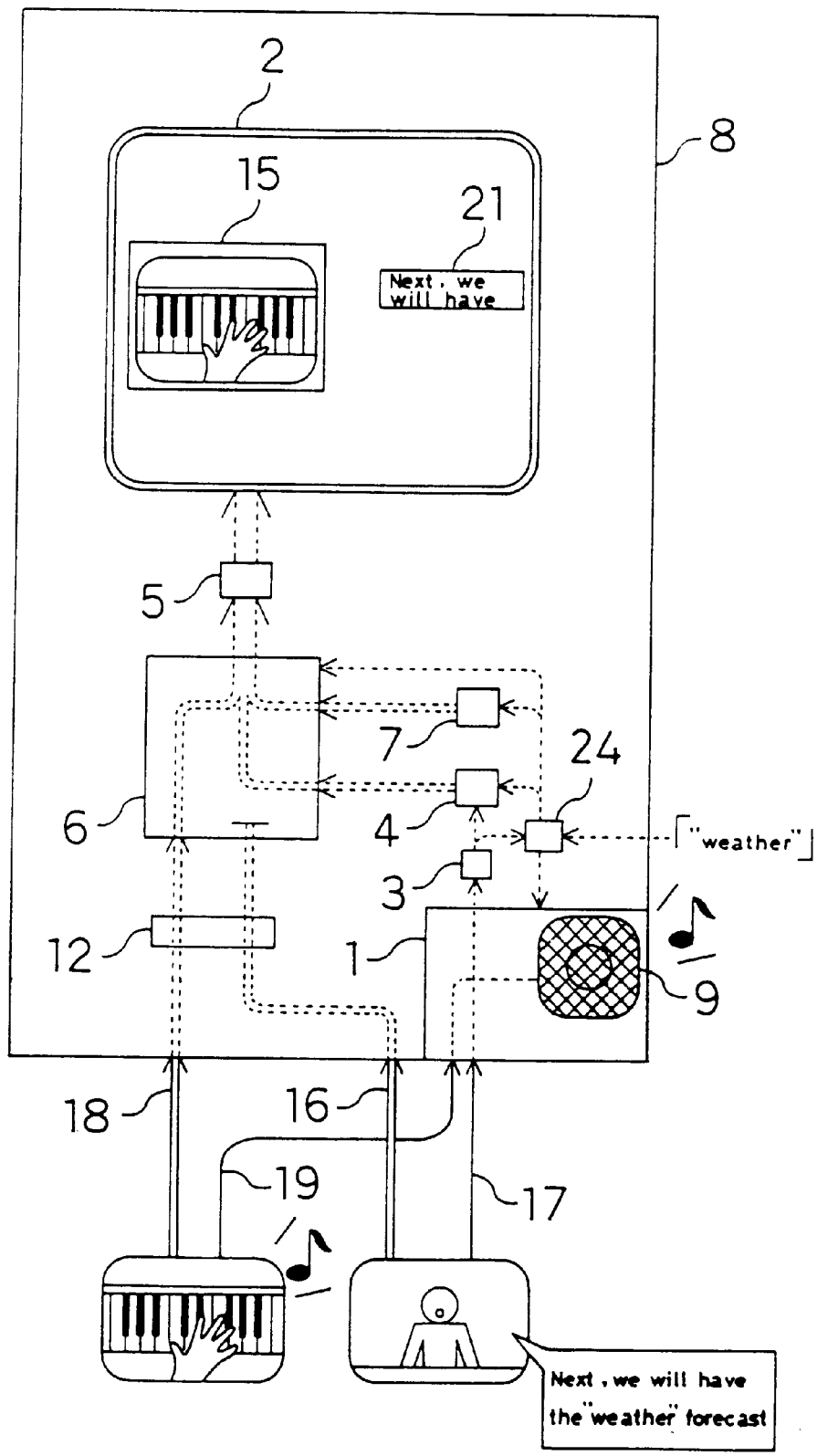
FIG. 8 is a diagram describing operations of the computer of the sixth embodiment before the detection of a correspondence.
Figure 9:
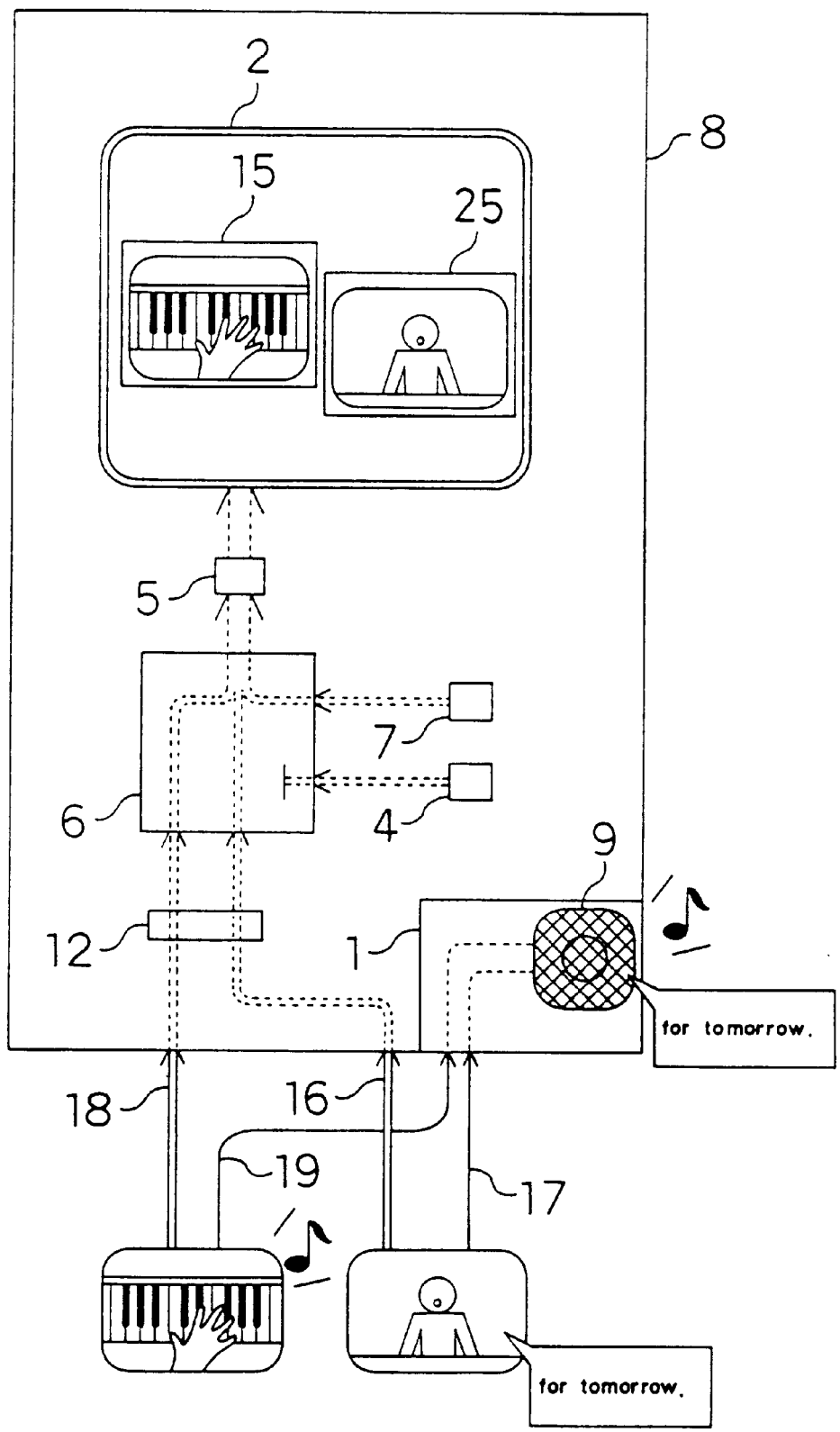
FIG. 9 is a diagram describing operations of the computer of the sixth embodiment after the detection of a correspondence.

The operation of the computer 8 according to this embodiment is described by reference to FIGS. 8 and 9. This description is made on the condition: (a) that the audio signal 17 (announcer's voice tone) is not output in the form of a sound (that is, the signal 17 is not output in the form of a sound through the loudspeaker 9), (b) that the audio information extract unit 3 extracts a sentence as real-time information by recognizing speech within the audio signal 17, (c) that the icon image generator 4 correspondingly displays the animated news caption 21 as an animated image according to the extracted sentence, and (d) that the display unit controller 5 exerts control so that the animated news caption 21 is displayed on the screen of the display unit 2. In other words, this is a status prior to FIG. 8.

Here, a sentence extracted from the audio signal 17, i.e., "Next, we will have the "weather" forecast . . . ", is fed to the comparator 24 for comparison with a particular item of information predetermined by an operator (in this case, a character string of the word "weather" in FIG. 8). When an equal comparison occurs, the comparator 24 sends out a detection signal indicating such a correspondence to the audio signal input/output unit 1, the icon image generator 4, the CG image generator 7, and the image synthesizer 6. As a result, the icon image generator stops generating the animated news caption 21. The image synthesizer 4, as shown in FIG. 9, is fed with both the video animation signal 18 (pianist) and the video animation signal 16 (announcer), whereby these two video animation signals 16 and 18 are combined with their respective static images generated by the CG image generator 7 so as to display resulting synthesized signals on windows 15 and 25 of the screen of the display unit 2, respectively. As a result of this, the display unit 2 now displays an animated image of an announcer who is reading an item of news in the window 25 instead of displaying the animated news caption 21. In synchronism with the image synthesizer 6, the audio signal 17 is output in the form of a sound. This accordingly allows an operator to timely hear even information, temporarily and deliberately excluded by the operator, by means of the automatic monitoring of such information.

In this embodiment, the comparator 25 makes a comparison between real-time information extracted from an audio signal and information predetermined by an operator so as to detect whether they agree with each other. However, if information predetermined by an operator is a volume level having a predetermined value, the comparator 25 may detect a difference between real-time information and operator's information when an extracted volume level goes beyond that predetermined value. The main point is to detect timing that an equal comparison occurs.

In this embodiment, as real-time information extracted by the audio information extract unit 3 from an audio signal, a sentence as a result of the speech recognition is used for comparison with a character string previously established by an operator. Other than this, a musical note as a result of the musical note recognition or a result obtained by recognizing the type of sound source may be used for comparison with a musical note or sound source name predetermined.

Further, in this embodiment, the generation of icon images is brought to a halt by a detection signal which is delivered when an equal comparison occurs so as to redisplay an animated image of an announcer who is reading news in a window. However, such a detection signal may be notified to an operating system as an interruption signal. This reduces the burden to be handled by an information processing unit which monitors signals.

Seventh Embodiment

Figure 10:
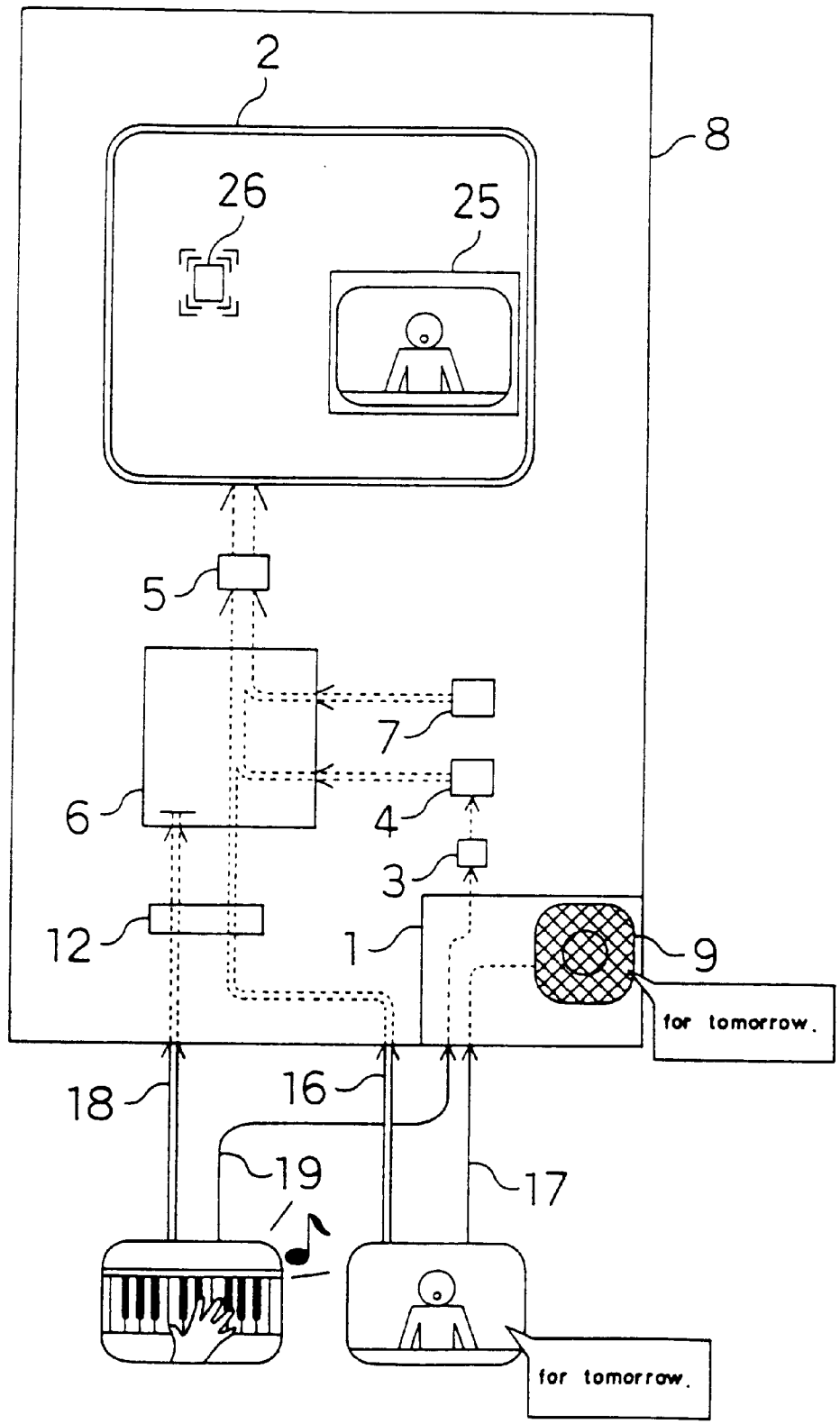
FIG. 10 shows how a computer of a seventh embodiment of the invention operates.

A seventh embodiment is described by reference to FIG. 10. This embodiment is a variation of the sixth embodiment of FIG. 9. Upon detecting a correspondence between the audio signal 17 (voice tone) and information previously established, i.e., a character string of the word "weather", the audio signal input/output unit 1 stops the audio signal 19 (piano sound) from being output in the form of a sound thereby outputting only the audio signal 17 in the form of a sound through the loudspeaker 9. The image synthesizer 6 stops being fed with the video animation signal 18 (pianist). The audio information extract unit 3 extracts real-time information out of the audio signal 19 (piano sound) for the generation of an animated icon image 26. Under control, both the animated icon image 26 and the animated image 25 of an announcer are displayed on the screen of the display unit 2.

In this embodiment, an operator can hear nothing but information about the weather forecast which the operator wishes to hear. In other words, no audio signals representing a piano sound are output through the loudspeaker 9 in the form of a sound. Further, since an animated image of a pianist corresponding to information which is not being referred to by an operator is displayed as a small icon image, this allows the operator to hear his or her target information with ease.

The invention claimed is:

1. A computer comprising:
   (a) a display unit for displaying different information on different windows assigned on its screen,
   (b) an audio information extract unit for extracting time-variable audio information from time-series amplitude information which is included in an audio real time signal received from the outside,
   (c) an icon image generator for changing one of the windows, which corresponds to the information included in the audio real time signal, to a time-variable icon having an image that conveys the time-variable audio information extracted from the audio real time signal, wherein the generated time-variable icon image varies reflective of variations in the time-variable audio information extracted from the audio real time signal, and
   (d) a display controller for controlling said display unit to display said generated time-variable icon image on the screen.

2. A computer comprising:
   (a) a display unit for displaying different information on different windows assigned on its screen,
   (b) an audio information extract unit for extracting time-variable audio information from time-series amplitude information which is included in an audio real time signal received from the outside,
   (c) an icon image generator for changing one of the windows, which corresponds to the information included in the audio real time signal, to a time-variable icon image that conveys the time-variable audio information extracted from the audio real-time signal, wherein the generated time-variable icon image varies reflective of variations in the time-variable audio information extracted from the audio real time signal,
   (d) a display controller for controlling said display unit to display said generated time-variable icon image on the screen, and
   (e) a comparator for comparing said time-variable audio information extracted from the audio real time signal with predetermined information and generating a signal indicating correspondence between the extracted time-variable audio information and the predetermined information, wherein said icon image generator and said display controller respond to the signal generated by the comparator.

3. A computer as in either claim 1 or claim 2, wherein said time-variable audio information extracted by said audio information extract unit from the second audio signal is data representing a volume level.

4. A computer as in claim 3, wherein said icon image generator generates a time-variable icon image that varies in size over time reflective of the time-variable audio information regarding the volume level extracted by said audio information extract unit from the second audio signal.

5. A computer as in either claim 1 or claim 2, wherein said icon image generator generates a time-variable icon image that varies in size over time reflective of the time-variable audio information extracted by the audio information extract unit.

6. A computer as in either claim 1 or claim 2, wherein:
   said time-variable audio information extracted by said audio information extract unit from the second audio signal is semantic data resulting from recognizing speech within the second audio signal; and
   said icon image generator generates a time-variable icon image conveying the semantic data extracted from the second audio signal.

7. A computer as in either claim 1 or claim 2, wherein:
   said time-variable audio information extracted by said audio information extract unit from the second audio signal is musical data resulting from recognizing a musical note within the second audio signal; and said time-variable icon image generated by said icon image generator conveys that the second audio signal contains musical data, and varies reflective of the variations in the extracted musical data.

8. A computer as in either claim 1 or claim 2, wherein said time-variable audio information extracted by said audio information extract unit from the second audio signal is data resulting from recognizing a tone generator of an origin of the second audio signal; and the time-variable icon image generated by the icon image generator conveys the extracted tone generator data of the origin of the second audio signal and varies reflective of variations in the tone generator recognized by the audio information extract unit.

9. A computer as in claim 2, further comprising:

an audio signal input/output unit for receiving a plurality of external audio signals, selecting a first audio signal from among the received plurality of external audio signals, and aurally outputting the first audio signal.

10. A computer as in claim 9, wherein (a) said time-variable audio information extracted by said audio information extract unit from the second audio signal is semantic data representing a character string resulting from recognizing speech within the second audio signal, (b) the predetermined information is a predetermined character string, and (c) said comparator compares said extracted semantic data with the predetermined character string and the signal generated by the comparator indicates correspondence between said extracted semantic data and said predetermined character string.

11. A computer as in either claim 2 or claim 10, wherein said comparator generates a signal upon detecting correspondence between the time-variable audio information extracted from the second audio signal and the predetermined information, and in response to the generated signal indicating correspondence, said icon image generator stops generating the icon image corresponding to the second audio signal while at the same time said display controller controls said display unit to display information corresponding to said second audio signal on the screen instead of displaying said icon image.

12. A computer as in either claim 10 or 9, wherein said comparator generates a signal upon detecting correspondence between the time-variable audio information extracted from the second audio signal and the predetermined information, and in response to the generated signal indicating correspondence, said audio signal input/output unit stops aurally outputting the first audio signal and aurally outputs said second audio signal.

13. A computer as in either claim 2 or claim 10, wherein said comparator generates a signal upon detecting correspondence between the time-variable information extracted from the second audio signal and the predetermined information, and in response to the generated signal indicating correspondence, said audio input/output unit stops aurally outputting the first audio signal while at the same time said display controller controls said display unit to display time-variable icon image for the first audio signal.

14. A computer comprising:

(a) a display unit for displaying different information on different windows assigned on its screen, (b) an audio information extract unit for extracting, from an audio signal received from the outside, semantic data resulting from recognizing speech with the second audio signal, (c) an icon image generator for generating a time-variable icon image in the form of a caption reflective of the extracted semantic data, and (d) a display controller for controlling said display unit to display said generated time-variable icon image on the screen.

15. A computer as in either claim 1 or claim 14, further comprising:

an audio signal input/output unit for receiving a plurality of external audio signals, selecting a first audio signal from among the received plurality of external audio signals, and aurally outputting the first audio signal.

* * * * *

UNITED STATES PATENT AND TRADEMARK OFFICE
CERTIFICATE OF CORRECTION

PATENT NO. : 5,969,719
DATED : October 19, 1999
INVENTOR(S) : Tsujimoto

It is certified that error appears in the above-identified patent and that said Letters Patent is hereby corrected as shown below:

ON THE TITLE PAGE:

Item [56] insert --FOREIGN DOCUMENTS

| | | |
|---|---|---|
| 2-257332 | Japan | 10/90 |
| 1-120595 | Japan | 5/89 |
| 64-7226 | Japan | 1/89-- |

Signed and Sealed this

Eighth Day of August, 2000

Attest:

Q. TODD DICKINSON

*Attesting Officer*     *Director of Patents and Trademarks*